Aug. 14, 1923.
S. R. MORDEN
GREASE RETAINER
Filed Nov. 16, 1922
1,464,770
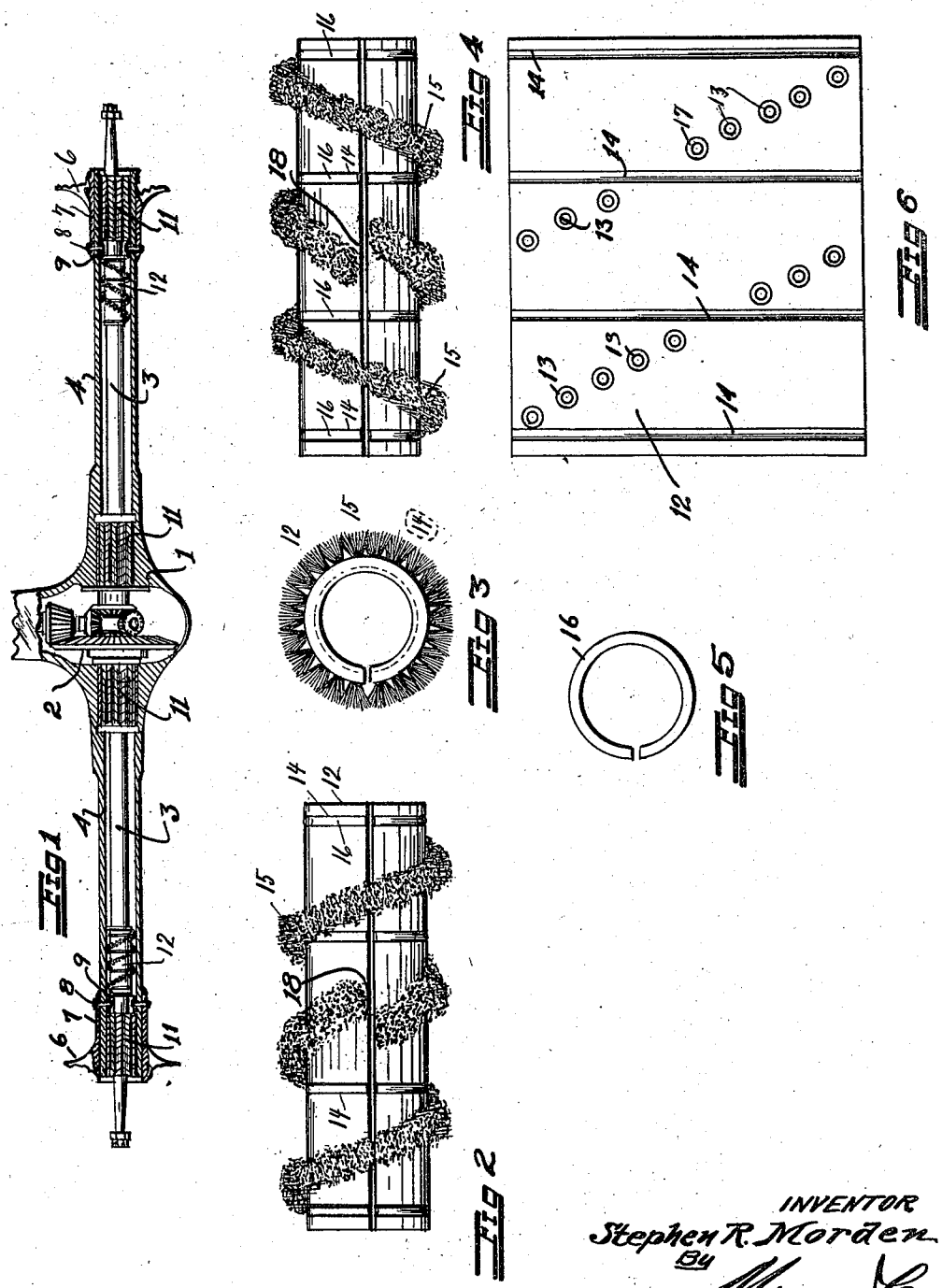

Patented Aug. 14, 1923.

1,464,770

UNITED STATES PATENT OFFICE.

STEPHEN RICHARD MORDEN, OF SAN FRANCISCO, CALIFORNIA.

GREASE RETAINER.

Application filed November 16, 1922. Serial No. 601,423.

*To all whom it may concern:*

Be it known that I, STEPHEN RICHARD MORDEN, a subject of the King of Great Britain, and a resident of San Francisco, county of San Francisco, State of California have invented a new and useful Grease Retainer, of which the following is a specification.

The present invention relates to improvements in grease retainers and is particularly designed to be used on the rear axle of a Ford automobile, although not confined to that machine. The principal object of the invention is to prevent grease introduced into the differential housing from working outwardly along the rear axle into the brake drum. For this purpose it is proposed to use a spiral brush secured to the rear axle and engaging the wall of the housing, the spiral arrangement serving to continuously return any grease that may attempt to work its way into the brake drum.

Particular advantages of my device are that it may be very easily installed, that it will last a long time, that it is efficient and that it returns the grease without in anyway injuring either the axle or the axle housing.

The preferred form of my invention is illustrated in the accompanying drawing in which Figure 1 shows a horizontal cross section through the rear axle arrangement of a Ford automobile having my spiral brush attached thereto, Figure 2 an enlarged detail view of my spiral brush as used on the left-hand side of the rear axle, Figure 3 an end view of the same, Figure 4 a side view of a spiral brush adapted to be used on the right-hand side of the rear axle, Figure 5 a detail view of a split ring used in connection with the spiral brush and Figure 6 a plan view of a pattern out of which the backing for the brush may be made. While I have shown only the preferred form of the invention it should be understood that various changes or modifications may be made within the scope of the claims hereto attached without departing from the spirit of the invention.

In Figure 1 is shown the rear axle arrangement of a Ford automobile including the differential housing (1), the differential transmission arrangement (2), the two rear axles (3) and the rear axle housing (4). A brake shoe support (6) terminating in a sleeve (7) is secured to the outside of the rear axle housing at either end by means of rivets (8) passing through registering perforations in said sleeve and the housing and the reinforcing member (9), which latter is provided on the inside of the housing. Roller bearings (11) are provided at either end of the rear axles in the usual manner.

The device thus far described offers no new features. My invention consists in the introduction of a spiral brush into the rear axle housing for the purpose of preventing grease or oil from working from the differential housing into the brake drum. The backing (12) of my brush is made preferably of leather cut into the rectangular form shown in Figure 6 provided with two diagonal rows of perforations (13) adapted to receive bristles (15) and also with a plurality of longitudinal grooves (14). The leather is preferably soaked in water and then pressed into tubular form with a diameter slightly smaller than the diameter of the rear axle on which it is to fit. The sleeve thus formed is split longitudinally and has a tendency to contract if forced on an axle or a shaft of slightly larger diameter than that of the tube. To intensify this clamping action I provide a plurality of split rings (16) made of spring material adapted to engage the grooves (14) previously mentioned. The rings are preferably made slightly oblong as shown in Figure 5 and have a tendency to further clamp the sleeve to the rear axle.

The bristles are introduced in the various perforations (13) which latter taper outwardly as shown at (17) and extend from the tube in radial direction so as to strike the inner surface of the rear axle housing. The bristles are preferably made a little longer than the distance between the rear axle and the rear axle housing so that they are slightly bent when the brush is in place and wipe the surface of the housing like a paint brush wipes a surface to be painted. The bristles are arranged in spiral form whereby a screw action is obtained and the grease is worked toward the differential continuously. It will be noticed from Figures 2 and 3 that where the spiral is interrupted through the split in the tube as at (18) the bristles are set back to compensate for the break in the spiral caused by the split.

A particular advantage of my spiral brush is that it can be introduced into the axle housing of a Ford car without interference from the reinforcing member (9) previously referred to. A brush made of felt or metal could not be forced into the housing on account of said reinforcing member but the bristles will yield while passing through said member and rise again thereafter. The construction of the sleeve is such that the split rings cooperate with the split sleeve in making a tight fit around the axle and while this manner of holding the sleeve to the axle is sufficiently yielding to allow the sleeve to be pushed on the axle it holds the sleeve sufficiently tight to prevent its working loose.

I claim:

1. A grease retainer for a shaft rotating in a housing, comprising spirally arranged bristles disposed so as to rotate with the shaft.

2. A grease retainer for a shaft rotating in a housing, comprising a sleeve member adapted to engage the shaft and spirally arranged bristles supported therein engaging the housing.

3. A grease retainer for a shaft rotating in a housing, comprising a longitudinally split sleeve member adapted to be clamped on the shaft and spirally arranged brushing members supported therein engaging the housing.

4. A grease retainer for a shaft rotating in a housing, comprising a longitudinally split sleeve member adapted to be clamped on the shaft and spirally arranged brushing members supported therein engaging the housing, the spiral of brushing members being set back after crossing the split to compensate for the break in the spiral caused by the split.

5. A grease retainer for a shaft rotating in a housing, comprising a longitudinally split sleeve member adapted to clampingly engage the shaft, split rings covering the split in the sleeve for reinforcing its grip on the shaft and maintaining the alinement, and spirally arranged brushing members supported in the sleeve engaging the housing.

6. A grease retainer for a shaft rotating in a housing, comprising a longitudinally split sleeve member adapted to clampingly engage the shaft, split rings covering the split in the sleeve for reinforcing its grip on the shaft and maintaining the alinement and spirally arranged brushing members supported in the sleeve engaging the housing, the spiral of brushing members being set back after crossing the split to compensate for the break in the spiral by the split.

STEPHEN RICHARD MORDEN.